(12) United States Patent
Momose

(10) Patent No.: US 10,975,934 B2
(45) Date of Patent: Apr. 13, 2021

(54) GEARED MOTOR AND ROBOT COMPRISING SAID GEARED MOTOR

(71) Applicant: NIDEC COPAL CORPORATION, Tokyo (JP)

(72) Inventor: Yosuke Momose, Tokyo (JP)

(73) Assignee: NIDEC COPAL CORPORATION, Tokyo (JP)

(*) Notice: Subject to any disclaimer, the term of this patent is extended or adjusted under 35 U.S.C. 154(b) by 0 days.

(21) Appl. No.: 16/508,621

(22) Filed: Jul. 11, 2019

(65) Prior Publication Data
US 2020/0018382 A1    Jan. 16, 2020

(30) Foreign Application Priority Data

Jul. 12, 2018 (JP) .............................. JP2018-132176

(51) Int. Cl.
| | |
|---|---|
| *F16H 1/28* | (2006.01) |
| *F16H 1/36* | (2006.01) |
| *H02K 7/116* | (2006.01) |
| *H02K 11/21* | (2016.01) |
| *G01D 5/34* | (2006.01) |
| *B25J 9/10* | (2006.01) |
| *H02K 11/22* | (2016.01) |

(52) U.S. Cl.
CPC ................ *F16H 1/36* (2013.01); *B25J 9/102* (2013.01); *G01D 5/34* (2013.01); *H02K 7/116* (2013.01); *H02K 11/22* (2016.01); *F16H 2001/289* (2013.01)

(58) Field of Classification Search
CPC ..... F16H 1/36; F16H 2001/289; H02K 11/22; H02K 7/116; B25J 9/102; G01D 5/34
See application file for complete search history.

(56) References Cited

U.S. PATENT DOCUMENTS

| | | | |
|---|---|---|---|
| 6,492,787 B1* | 12/2002 | Hibino | F16H 1/32 310/83 |
| 10,122,243 B2* | 11/2018 | Hirai | H02K 5/20 |
| 2002/0088293 A1* | 7/2002 | Ito | G01D 5/04 74/424 |
| 2007/0129207 A1* | 6/2007 | Kanamori | H02K 11/24 475/331 |
| 2009/0120225 A1* | 5/2009 | Saya | H02K 7/1166 74/421 A |
| 2018/0183303 A1* | 6/2018 | Du | H02K 7/003 |
| 2019/0346023 A1* | 11/2019 | Kamiya | F16H 1/32 |

FOREIGN PATENT DOCUMENTS

JP    2012-191769 A    10/2012

* cited by examiner

*Primary Examiner* — Tisha D Lewis
(74) *Attorney, Agent, or Firm* — Troutman Pepper Hamilton Sanders LLP

(57) ABSTRACT

A motor portion wherein a driveshaft protrudes from the front end of a motor case; a gear mechanism portion is provided on the front side of the motor portion; and a connecting member, between the motor portion and the gear mechanism portion, for connecting these coaxially, wherein: the angle of rotation or rotational speed, or the like, of the driveshaft can be detected through a detecting portion.

4 Claims, 4 Drawing Sheets

GEARED MOTOR AND ROBOT COMPRISING SAID GEARED MOTOR

CROSS-REFERENCE TO RELATED APPLICATIONS

This application claims priority to Japanese Application No. 2018-132176 filed Jul. 12, 2018. This application in incorporated herein by reference in its entirety.

FIELD OF TECHNOLOGY

The present invention relates to a geared motor for outputting the rotation of a motor through a gear mechanism, and to a robot equipped with this geared motor.

BACKGROUND

Geared motors, which use gear mechanisms to reduce the rotational driving force of motors, are used in electrical mechanisms in a variety of equipment and devices. In some geared motors, the rotational force of the driveshaft of the motor is relayed by a coaxially positioned planetary gear mechanism, to be outputted from an output shaft on the front end side thereof.

In such a geared motor, in some cases when obtaining information regarding the rotation, such as the rotational speed or angle of rotation of a rotating part, the detection accuracy can be improved by detecting a rotating part on the motor side rather than detecting a rotating part on the gear mechanism side.

Given this, in the prior art described in, for example, Japanese Unexamined Patent Application Publication 2012-191769, the driveshaft of the motor extends through the planetary gear mechanism to extend further forward, and a pulse plate is provided on the extending part, and detection is performed on this pulse plate using a photointerrupter.

In addition, as other technical means one may can consider extending the driveshaft of the motor to the end of the motor that is opposite that of the prior art described above, providing a pulse plate on the extending part, to perform detection on the pulse plate using a photointerrupter.

However, in the structure set forth above, it is necessary to insert the motor driveshaft into the planetary gear mechanism, and to extend the motor driveshaft to the front or to the rear. Moreover, it is necessary to provide an interconnection structure for the photointerrupter further to the front side than the planetary gear mechanism or further to the back side than the end of the motor. The result is that this tends to cause the structure to be more complex, and to increase the total length dimension.

SUMMARY

In order to solve such a problem, the present invention is provided with the following structures a geared motor having a motor portion wherein a driveshaft protrudes from a front end of a motor case; a gear mechanism portion that is provided on the front side of the motor portion; and a connecting member, between the motor portion and the gear mechanism portion, for connecting these coaxially, wherein: a detecting portion for detecting rotation of the driveshaft is provided on the connecting member.

BRIEF DESCRIPTIONS OF THE DRAWINGS

DETAILED DESCRIPTION

Embodiments according to the present invention will be explained below in reference to the drawings. In the descriptions below, identical reference symbols in the different drawings below indicate positions with identical functions, and redundant explanations in the various drawings are omitted as appropriate.

Figure 1:
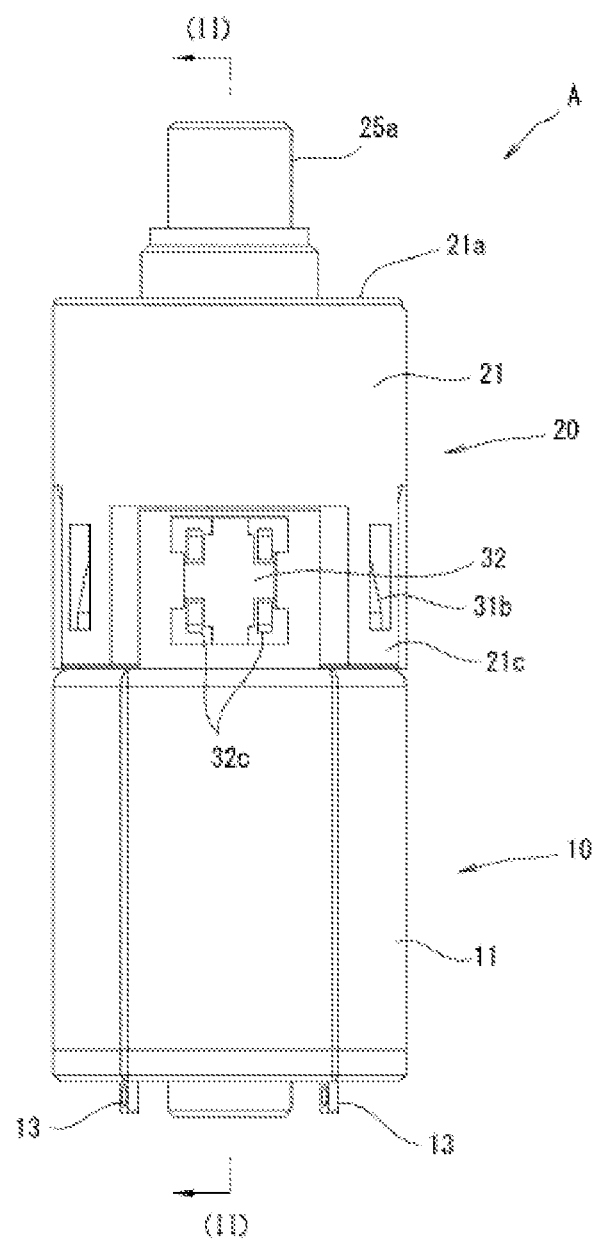
FIG. 1 is a side view depicting an example of a geared motor according to the present invention.
Figure 2:
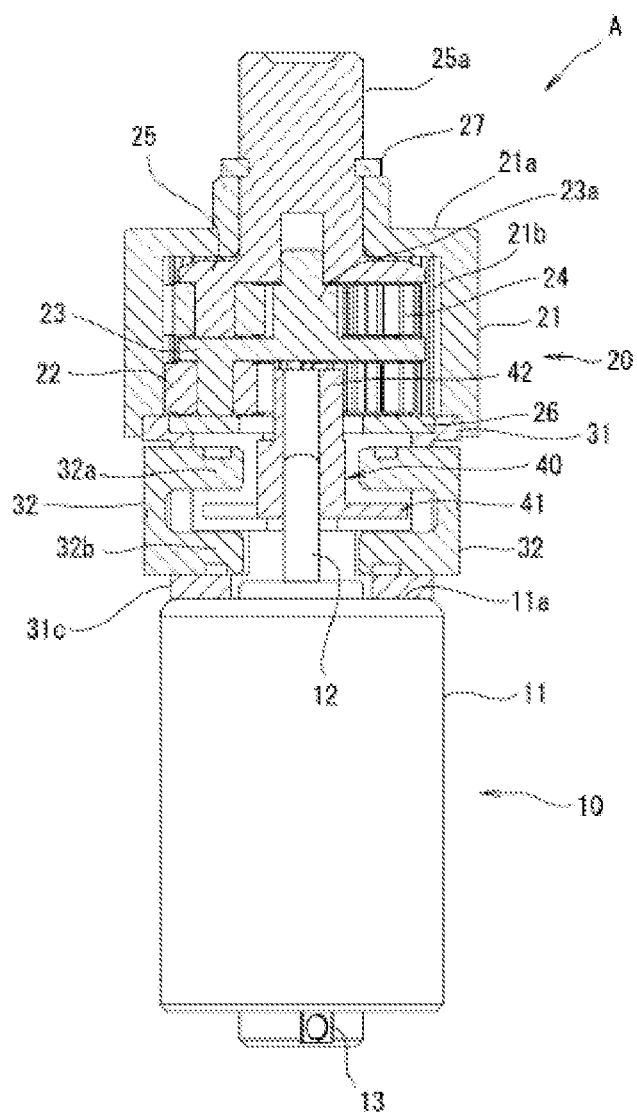
FIG. 2 is a diagram depicting a cross-section of the gear mechanism portion along the section (II)-(II) in FIG. 1.
Figure 3:
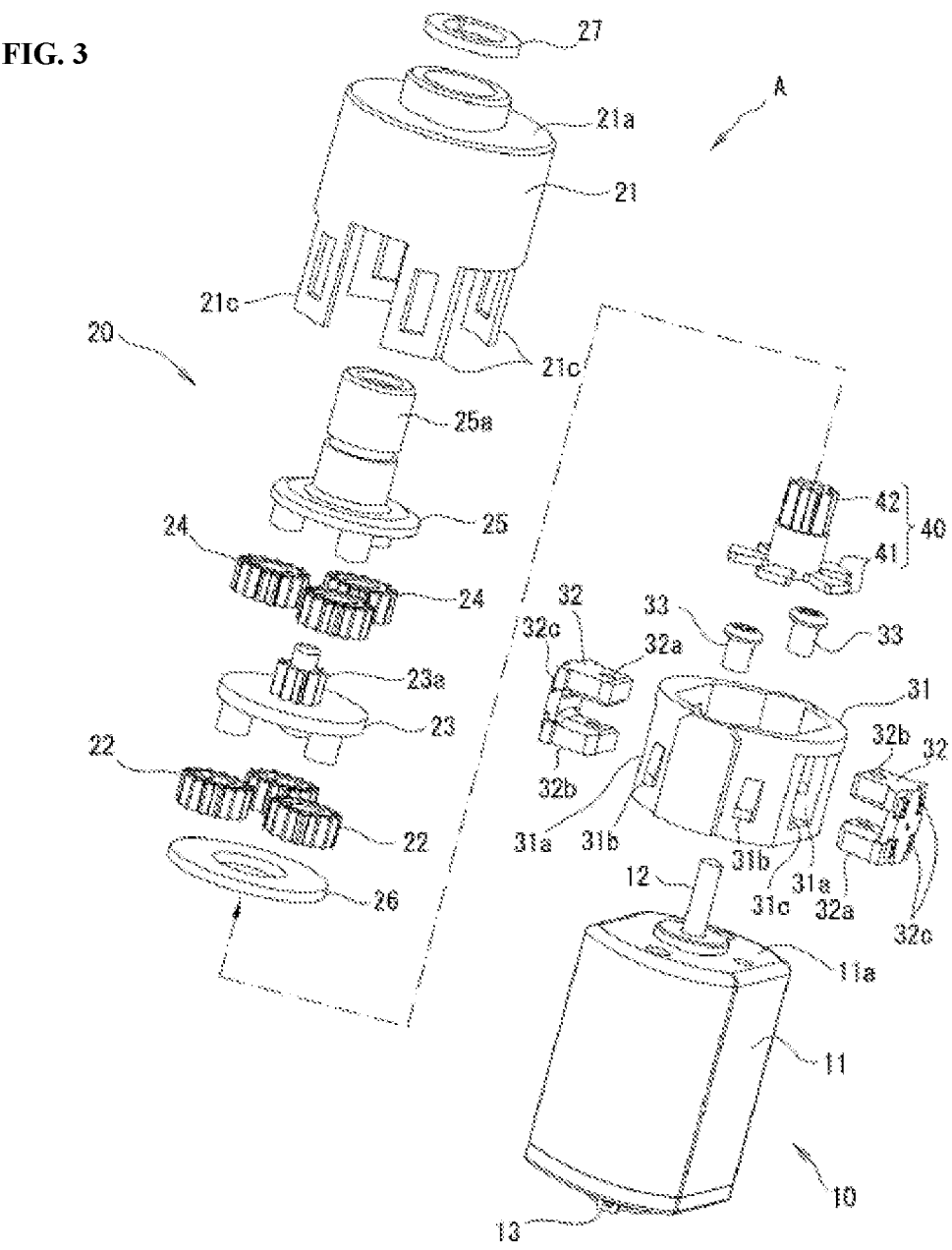
FIG. 3 is an assembly perspective diagram of the geared motor.

A geared motor A, as illustrated in FIG. 1 through FIG. 3, comprises: a motor portion 10 wherein a driveshaft 12 protrudes from the front end of a motor case 11; a gear mechanism portion 20 that is provided on the front side of the motor portion 10; a connecting member 31, between the motor portion 10 and the gear mechanism portion 20, for connecting these coaxially; and a detecting portion 32 that is provided on the connecting member 31, wherein: the angle of rotation or rotational speed, or the like, of the driveshaft 12 can be detected through the detecting portion 32.

The motor portion 10 may be, for example, a well-known DC servo motor, stepping motor, or the like, which causes the driveshaft 12, which protrudes to the front from the motor case 11, to rotate, through provision of electric power to a power supply terminal 13 on the back end side.

The motor case 11 is formed in essentially a closed-bottom cylindrical shape, having a front wall portion 11a for securing the connecting member 31.

Moreover, a detection gear member 40 is provided in a ring shape, secured to the front end side of the driveshaft 12 that protrudes from the motor case 11.

The detection gear member 40 has a plurality of detection portions 41 that can be detected by the detecting portion 32, provided integrally with a driving gear 42 that relays rotational force to the gear mechanism portion 20.

The detection portions 41 are flat plate-shaped members in a plane that is essentially perpendicular to the driveshaft 12, provided in a plurality (five, in the illustrated example), arranged in the circumferential direction with prescribed spacing. Each detection portion 41 protrudes in the outer radial direction, in a space within the connecting member 31. The driving gear 42 is a flat gear that protrudes to the front from the center portion of the plurality of detection portions 41, and is provided coaxially in respect to the driveshaft 12 and the detection portions 41.

Moreover, the gear mechanism portion 20 is structured as a planetary gear mechanism comprising, within an essentially cylindrical gear case 21 that has an inner gear 21b (referencing FIG. 2) on the inner peripheral portion thereof: a plurality of planetary gears 22 that use the driveshaft 12 as the sun gear, meshing with the outer peripheral portion thereof, and mesh also with the inner gear 21b within the gear case 21; a carrier 23 for supporting each of the planetary gears 22, from the front sides thereof, so as to enable rotation thereof, and that also has a second-stage sun gear 23a on the front end side thereof; a plurality of planetary gears 24 that mesh with the outer peripheral portion of the sun gear 23a and mesh also with the inner gear 21b on the inside of the gear case 21; and a carrier 25 that supports each of the planetary gears 24, from the front sides thereof, so as to enable rotation, and which also has an output shaft 25a on the front end side, wherein: the rotation of the driveshaft 12 is reduced sequentially and related to the output shaft 25a. In the figure, reference symbol 26 is a ring-shaped bearing member that bears the back end faces of the planetary gears 22. Additionally, reference symbol 27 is a retaining ring that fits on the output shaft 25a, to prevent the carrier 25 from moving rearward.

Note that while the rotation of the driveshaft 12 is reduced in two stages, the number of sun gears, planetary gears, carriers, and the like can be increased or decreased, to produce configurations that perform the reduction in a single stage or in three or more stages.

The gear case 21 is formed in essentially a closed-bottom cylindrical shape, having a front wall portion 21a into which the output shaft 25a is inserted, has an inner gear 21b (referencing FIG. 2) on the inner peripheral surface of the peripheral wall thereof, and has, on the peripheral wall that is further toward the back than the inner gear 21b, a plurality of engaging pieces 21c that protrude rearward, disposed spaced out in the circumferential direction (referencing FIG. 3).

Additionally, the connecting member 31 is formed in an essentially cylindrical shape into which the driveshaft 12 and the detection gear member 40 are loosely inserted, and has, in the peripheral wall thereof, a plurality of pass through-type support holes 31a for supporting the detection portions 32, through insertion thereof from the outside, and a plurality of engaged portions 31b that engage each of the plurality of engaging pieces 21c. The connecting member 31 has a ring-shaped wall portion 31c on the back end side, and is fastened to the front wall portion 11a of the motor case 11 through screws 33 that are inserted into the wall portion 31c.

Note that while in the illustrated example, a pass-through-type engaging hole is provided in the engaging piece 21c, where this engaging hole engages with a protruding engaged portion 31b, the engaging piece 21c may be formed as a protrusion instead, and the engaged portion 31b may be an engaging hole.

Moreover, the detecting portion 32 is an optical rotation detecting sensor for non-contact detection of the detection portion 41 in the vicinity of the detection portion 41. The detecting portion 32, in the example that is illustrated, is a photointerrupter comprising a light-emitting portion 32a and a photodetector 32b, which face each other with a space therebetween, and outputs a detection signal when the light that passes between the light-emitting portion 32a and the photodetecting portion 32b is blocked by a detection portion 41. Two of these detection portions 32 are provided, positioned on one side and on the other side in the radial direction. Each detecting portion 32 is positioned between two adjacent engaging pieces 21c in the gear case 21, and is secured through insertion into a supporting hole 31a in the peripheral wall of the connecting member 31. The means for securing the detecting portion 32 in the supporting hole 31a may be, for example, press fitting, adhesive bonding, or the like. Note that, as another example, the detecting portion 32 may be a reflective sensor wherein the light that is emitted from the light-emitting portion is reflected by the detection portion 41 and received by a photodetecting portion, or may use another type of rotation detecting sensor instead.

Additionally, in the detecting portion 32, a plurality of interconnection terminals 32c, for input/output, are exposed to the outside, facing outward in the radial direction, and a wiring board (for example, a flexible substrate, not shown) is connected electrically to these interconnection terminals 32c. The wiring board leads out to the rear, along the side face of the motor portion 10.

An example of an assembly process is explained next for the geared motor A of the structure described above. First the detection gear member 40 is installed in a ring shape and secured to the driveshaft 12 of the motor portion 10.

Next the connecting member 31 is secured, through fastening by screws 33, to the front end portion of the motor portion 10 so as to cover the detection gear member 40.

Following this, each detecting portion 32 is secured through fitting in the individual supporting hole 31a of the connecting member 31.

Following this, the gear mechanism portion 20 is connected, through the engaging pieces 21c and the engaged portions 31b, to the front side of the connecting member 31. The gear mechanism portion 20 may be assembled in advance prior to connecting to the connecting member 31, or may be assembled sequentially onto the front side of the connecting member 31.

Through this, in the geared motor A that is structured as described above, it is possible to avoid the provision of a complex structure for the detecting portion, the interconnection, or the like, with the driveshaft 12 extending further to the front side than the gear case 21 or further to the back side than the end of the motor, thus enabling detection of rotation of the driveshaft 12 through a simple structure wherein the total length dimension is relatively short. Moreover, in the flow of operations for connecting the motor portion 10 and the gear mechanism portion 20, each detecting portion 32 can be equipped easily, so the convenience in operations is good. Moreover, because the detecting portion 32 is exposed to the outside, between the motor portion 10 and the gear mechanism portion 20, it is easy to secure space for the connection with the detecting portion 32, enabling the interconnection operation to be performed easily as well.

A mobile information terminal and a robot that are equipped with the geared motor A of the structure described above will be explained next.

Figure 4A:
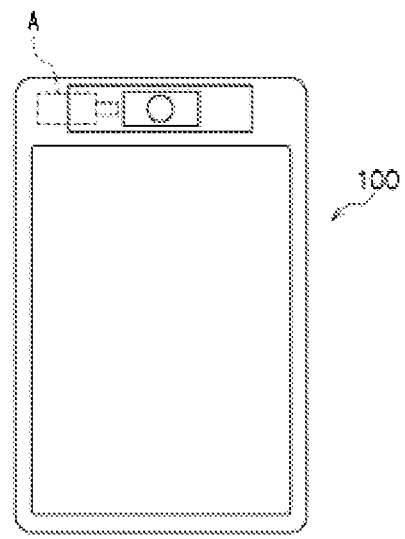
FIG. 4(a) is an example of application of the geared motor, wherein depicts an example of application to a mobile information terminal.
Figure 4B:
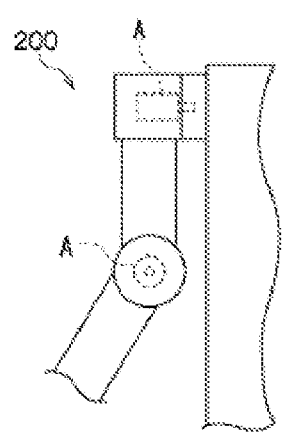
FIG. 4(b) is an example of application of the geared motor, wherein depicts an example of application to a joint part in a robot.

FIG. 4 depicts an example application of the geared motor A. As expected in FIG. 4(a), the geared motor A can be built into driving portion (a camera unit or cover opening/closing unit, or the like) of a mobile information terminal 100, such as a smart phone, and, as depicted in FIG. 4(b), it may be built into a joint driving portion of a robot 200. This information terminal 100 or robot 200 enables a structure wherein the total length dimension of the driving part of the geared motor A is relatively short, which further contributes to a smaller and lighter product as a whole.

Note that while in the embodiment described above, as a particularly preferred example, the gear mechanism portion 20 was a planetary gear mechanism, as another example the gear mechanism portion 20 may be a gear mechanism other than a planetary gear mechanism.

While embodiments according to the present invention were described in detail above, the specific structures thereof are not limited to these embodiments, but rather design variations within a range that does not deviate from the spirit and intent of the present invention are also included in the present invention. Moreover, insofar as there are no particular contradictions or problems in purposes or structures, or the like, the technologies of the various embodiments described above may be used together in combination.

I claim:

1. A geared motor comprising:
 a motor portion comprising:
  a motor case; and a driveshaft protruding from a front end of the motor case;

a gear mechanism provided on the front side of the motor portion;

a connecting member, between the motor portion and the gear mechanism, connecting these coaxially;

a detector detecting rotation of the driveshaft provided on the connecting member; and a pass through supporting hole supporting the detector, through insertion thereof from the outside, is provided in a peripheral wall of the connecting member, wherein the connecting member is formed in a cylindrical shape through which the driveshaft is passed, wherein the detector includes a plurality of detection portions each protruding in an outer radial direction, wherein the detection portions are disposed within the connecting member, wherein the detector is provided on the peripheral wall of the connecting member, wherein the detector is exposed to the outside through the supporting hole.

2. The geared motor as set forth in claim 1, further comprising:

a detection gear member provided on the driveshaft;

wherein the detection gear member comprises, integrally, a detection portion and a driving gear transmitting rotational force to the gear mechanism.

3. The geared motor as set forth in claim 2, wherein:

the gear mechanism comprises a cylindrical gear case comprising a second gear mechanism relaying rotation of the driveshaft structured in the interior thereof, a plurality of engaging pieces that protrude rearward are provided on a peripheral wall of the gear case spaced out in a circumferential direction; and a plurality of engaged portions, which engage with the respective plurality of engaging pieces, is provided on the peripheral wall of the connecting member, the detecting portion is exposed to the outside between engaged portions that are adjacent in the circumferential direction.

4. A robot comprising a geared motor as set forth in claim 1.

* * * * *